April 21, 1925.

O. R. BRINEY 1,534,766

SEALING MEANS FOR PISTONS AND THE LIKE

Filed Jan. 15, 1923

INVENTOR
Ottis R. Briney
BY
C. F. Heinkel.
ATTORNEY

Patented Apr. 21, 1925.

1,534,766

UNITED STATES PATENT OFFICE.

OTTIS R. BRINEY, OF PONTIAC, MICHIGAN.

SEALING MEANS FOR PISTONS AND THE LIKE.

Application filed January 15, 1923. Serial No. 612,828.

*To all whom it may concern:*

Be it known that I, OTTIS R. BRINEY, a citizen of the United States, residing at Pontiac, county of Oakland, and State of Michigan, have invented a new and useful Improvement in Sealing Means for Pistons and the like, of which the following is a specification.

My invention relates to means for sealing the joints between such rings as packing or piston rings and their housing.

In structures, where one member must move freely within or in relation to another member without leakage, it is necessary that a sealing means of some kind be provided which prevents or at least mitigates such leakage.

Therefore, the object of the present invention is to provide a simple and efficient means to prevent leakage and to automatically take up wear and to prevent leakage due to wear.

Figure 1:
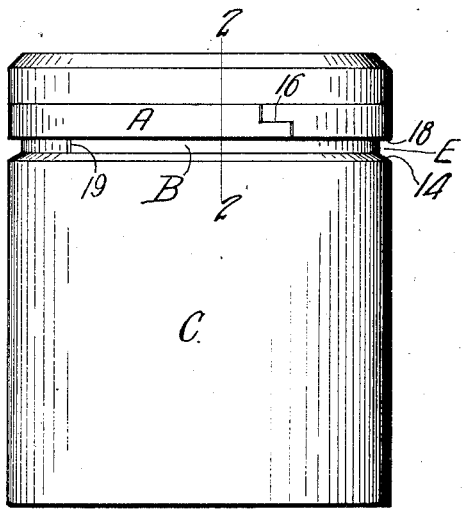
Figure 2:
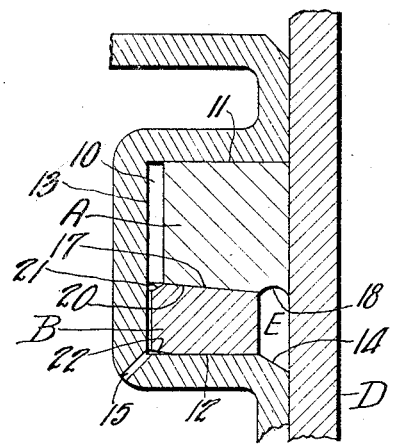
Figure 3:
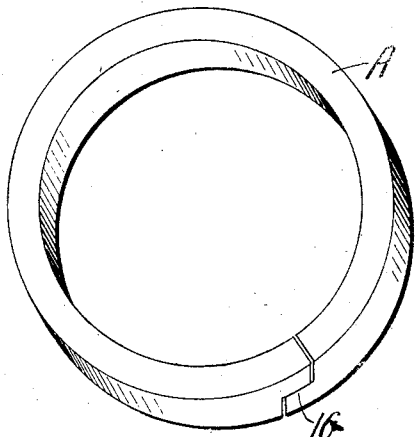
Figure 4:
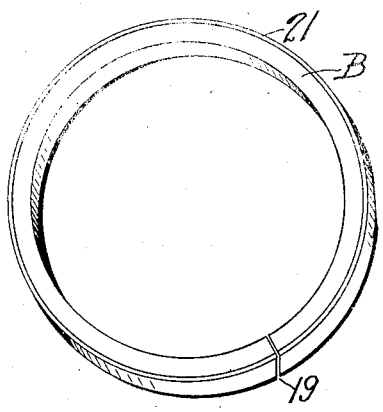

I attain this object by the mechanism shown in the accompanying drawing in which Fig. 1 is a side view of a piston equipped with a sealing mechanism embodying the features of the present invention, Fig. 2 is a section on line 2—2 of Fig. 1, on a larger scale, Fig. 3 is a perspective view of the piston ring of Fig. 1; Fig. 4 is a perspective view of the annular filler of Fig. 1.

Similar reference characters refer to similar parts throughout the views.

The sealing means shown in the drawing consists of the piston ring A and the annular filler B mounted in a groove in the piston C which operates in the cylinder D.

The piston C is provided with the groove 10 bounded by the walls 11 and 12 and the bottom 13. The wall 12 also has the relief face 14, the purpose whereof will appear presently. Otherwise the piston C may be constructed and proportioned as desired. It is preferred, however, that one or more oil holes 15 be provided so that whatever oil finds its way into the otherwise empty portion of the groove 10 may drain out through these holes.

The piston ring A is made in the usual manner with the usual inherent radial spring tendency and with the lap joint 16 but is, in the present instance, provided with the bevel face 17 and, adjacent thereto, the relief face 18 which is curved. The bevel of the face 17 is made as slight as possible so that the action of the ring A, when in operation, does not force the filler B radially inward.

The filler B is here formed annular and of smaller diameter than the ring A and with inherent radial spring tendency similar to the ring A and is split at 19.

This filler B has the bevel face 20 corresponding to the bevel face 17 and further has the relief face 21 adjacent to the bevel face 20 and the relief face 22 opposite the relief face 21.

Since the filler B does not contact the cylinder wall, it may be made of more tenacious material than the ring A with consequent greater inherent spring tendency to more readily follow the ring A and also help the same in its radial expansion.

The relief faces, 14 on the piston, 18 on the piston ring, and 21 and 22 on the filler, are provided to prevent the filler from seating itself permanently on the wall 12 or on the bevel face 17. It is well known in the art that the constant reciprocation of the piston and the ring, with most of the friction on the ring, soon causes the ring to wear a seat in the wall which it adjoins and thereby form a permanent seat and prevent its proper radial expansion.

In the present instance, such tendency to wear and form a permanent seat is more pronounced by the introduction of the filler which does not extend to the full width of the contacting faces and overhanging faces are formed.

When the parts are made up as set forth and assembled as seen sectionally in Fig. 2, the ring A forces itself radially outward against the wall of the cylinder D due to its inherent spring tendency, and the filler B also forces itself radially outward due to its inherent spring tendency.

This tendency of the filler B, to force itself radially outward, forces the ring A upward against the wall 11 and forces itself downward against the wall 12, thereby producing an effective seal at the walls of the groove in the piston as well as at the faces 17 and 20 which correspond to each other. The outer surface of the ring A forms the seal at the cylinder wall.

The filler B, being smaller in diameter than the ring A, forms an oil chamber at E into which the oil may, on the down stroke of the piston, be scraped from the cylinder wall by the edge of the overhanging face 18 (curved to better facilitate such scraping), and collected in the chamber E, and from which chamber oil is deposited on the cylinder wall on the upstroke of the piston by the overhanging face 14; thereby not only lubricating the cylinder wall at each upstroke but also scraping all surplus oil from the cylinder wall at each downstroke and helping to prevent excessive oil to reach the top of the piston.

As previously stated, the bevel of the faces 17 and 20 should be slight and should be just sufficient to permit the filler B to follow the radial expansion of the ring A when it wears or otherwise expands and thereby keep itself as well as the ring A upon their seats in the groove.

This bevel, however, should not be sufficiently slight to permit the filler B to wedge itself tightly in between the ring A and the wall 12 and thereby lock the entire structure and prevent its proper operation. Neither should this bevel be sufficiently great to permit the ring A to force the filler B inward and thereby loose one of the main features of the present invention. The amount of this bevel is determined by the diameter and the cross-sectional area of the ring A and the filler B and by the amount of friction (due to the area of the piston ring which contacts the cylinder wall) and consequent lateral pressure exerted by the ring A in its operative movements whether the filler B is placed below the ring A as shown or above.

Having described my invention as applied to the piston shown, I claim:—

1. A sealing means of the character described comprising, a ring provided with a bevel side face, an annular and radially split filler having a bevel side face bearing against said bevel side face of said ring and provided with inherent radial spring tendency and being smaller in external and internal diameter than said ring, to provide a face on said ring overhanging the outside of said filler and a face on said filler overhanging the inside of said ring, and said overhanging faces relieved to prevent seating between said ring and said filler.

2. In combination, a piston provided with a groove, a piston ring in one side of said groove and provided with a bevel side face, an annular and radially split filler in the other side of said groove and having a bevel side face bearing against said bevel face on the piston ring and provided with inherent radial spring tendency and being smaller in external and in internal diameter than said ring to provide a face on said ring overhanging the outside of said filler and a face on said filler overhanging the inside of said ring and a face on said piston overhanging the outside of said filler, and said overhanging faces of said piston and said ring and said filler relieved to prevent seating of either upon the other.

3. In combination, a cylinder, a piston in said cylinder and provided with a groove, a piston ring in said groove and provided with a bevel side face, an annular and radially split filler in said groove and having a bevel side face bearing against said bevel face of the ring and provided with inherent radial spring tendency and being smaller in external and in internal diameter than said ring to provide a face on said ring overhanging the outside of said filler and a face on said filler overhanging the inside of said ring and a face on said piston overhanging the outside of said filler thereby forming an oil chamber adjacent to one of the walls of said groove and open to the bore of said cylinder, and said overhanging faces of said piston and said piston ring and said filler relieved to prevent seating of either upon the other and to assist the lubrication of said cylinder wall and the prevention of the passage of lubricant to the top of said piston.

4. In combination, a cylinder, a piston in said cylinder and provided with a groove, a piston ring in said groove and bearing against one wall of said groove, a filler in said groove between said ring and the other wall of said groove and smaller in external diameter than said ring to provide an oil chamber below said ring, a curved annular groove in the side of said piston ring adjacent said filler to prevent seating of said filler on said ring, a downwardly extending and inwardly curved scraper formed by the outer edge of said annular groove to scrape surplus oil from the wall of said cylinder into said chamber during the down stroke of said piston, and the outer edge of said other wall of the groove in the piston beveled to deposit oil from said chamber onto said wall of the cylinder during the up stroke of said piston.

OTTIS R. BRINEY.